United States Patent
Hu et al.

(10) Patent No.: US 12,137,167 B2
(45) Date of Patent: Nov. 5, 2024

(54) WATERMARKING IN A VIRTUAL DESKTOP INFRASTRUCTURE ENVIRONMENT

(71) Applicant: VMware, Inc., Palo Alto, CA (US)

(72) Inventors: Jinxing Hu, Beijing (CN); Kar Fai Tse, Peachtree Corners, GA (US); Lina Li, Beijing (CN); Shengbo Teng, Beijing (CN); Lu Liu, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 754 days.

(21) Appl. No.: 16/276,692

(22) Filed: Feb. 15, 2019

(65) Prior Publication Data

US 2020/0244459 A1    Jul. 30, 2020

(30) Foreign Application Priority Data

Jan. 24, 2019   (WO) ................ PCT/CN2019/072958

(51) Int. Cl.
*H04L 9/32* (2006.01)
*G06F 9/455* (2018.01)
*G06T 1/00* (2006.01)
*H04L 9/08* (2006.01)

(52) U.S. Cl.
CPC ........ *H04L 9/3231* (2013.01); *G06F 9/45558* (2013.01); *G06T 1/0021* (2013.01); *H04L 9/0838* (2013.01); *H04L 9/0869* (2013.01); *G06F 2009/45587* (2013.01)

(58) Field of Classification Search
CPC ... H04L 9/3231; H04L 9/0869; H04L 9/0838; H04L 9/0863; G06F 9/45558; G06F 2009/45587; G06T 1/0021; G06T 1/005; G06T 1/0057; G06T 1/0028; G06T 2201/0083; G06T 2201/0052; G06T 2201/0202; G09C 5/00
See application file for complete search history.

(56) References Cited

U.S. PATENT DOCUMENTS 7,460,991 B2 *  12/2008  Jones ................... G01S 5/30
                                                        704/211
7,707,422 B2 *  4/2010   Shin .................... H04N 19/467
                                                        713/176
(Continued)

FOREIGN PATENT DOCUMENTS

CA        2269651 A1 *  11/1999  ............ G06T 1/005
CN     101122996 B   *  4/2011
WO   WO-2005059897 A1 * 6/2005  ........... G10L 19/018

OTHER PUBLICATIONS

Brannock et al. The Effect of Wavelet Families on Watermarking, Jun. 2009, Journal of Computers, vol. 4, No. 6. pp. 554-566. (Year: 2009).*

(Continued)

*Primary Examiner* — Dereena T Cattungal
(74) *Attorney, Agent, or Firm* — Kim & Stewart LLP

(57) ABSTRACT

Disclosed are examples of embedding watermarks in a VDI session of a user. The watermark is based upon the user's identity and can be embedded into the VDI session to aid in the identification of data that is compromised from the VDI session. The watermark can be extracted from an image without needing the original image for extraction purposes.

15 Claims, 5 Drawing Sheets

(56) References Cited

U.S. PATENT DOCUMENTS

| | | | | |
|---|---|---|---|---|
| 7,978,874 B2* | 7/2011 | Levy | ................ | H04N 21/23892 |
| | | | | 382/100 |
| 10,089,651 B2* | 10/2018 | Mahadevan | ..... | H04N 21/25435 |
| 11,062,018 B2* | 7/2021 | Dymond | ................ | G06F 21/46 |
| 2004/0047489 A1* | 3/2004 | Seo | ....................... | G06T 1/0028 |
| | | | | 382/100 |
| 2004/0091050 A1* | 5/2004 | Choi | .................... | H04N 1/3216 |
| | | | | 375/240.18 |
| 2004/0258243 A1* | 12/2004 | Shin | .................. | H04N 1/32165 |
| | | | | 380/210 |
| 2004/0264732 A1* | 12/2004 | Tian | ..................... | H04N 1/3217 |
| | | | | 382/100 |
| 2007/0030997 A1* | 2/2007 | Mihcak | ................ | G06T 1/0028 |
| | | | | 382/100 |
| 2008/0025564 A1* | 1/2008 | Kim | ..................... | H04N 13/261 |
| | | | | 382/100 |
| 2009/0220070 A1* | 9/2009 | Picard | .................. | G06T 1/0028 |
| | | | | 380/28 |
| 2010/0183225 A1* | 7/2010 | Vantaram | .................. | G06T 7/11 |
| | | | | 382/173 |
| 2011/0185179 A1* | 7/2011 | Swaminathan | ......... | G06F 21/10 |
| | | | | 713/176 |
| 2012/0128199 A1* | 5/2012 | Ono | ....................... | G06T 1/0028 |
| | | | | 382/100 |
| 2012/0272327 A1* | 10/2012 | Shin | ........................ | G06F 21/16 |
| | | | | 726/26 |
| 2013/0120651 A1* | 5/2013 | Perry | ................. | H04N 21/8358 |
| | | | | 348/441 |
| 2015/0150143 A1* | 5/2015 | Im | ........................... | G06F 21/16 |
| | | | | 726/26 |
| 2016/0049153 A1* | 2/2016 | Kakkirala | ............. | G06F 17/148 |
| | | | | 700/94 |
| 2017/0116693 A1* | 4/2017 | Rae | ....................... | H04L 9/3236 |
| 2017/0163839 A1* | 6/2017 | Arana | ................... | H04N 1/3232 |
| 2018/0253567 A1* | 9/2018 | Gonzalez-Banos | ..... | G06F 16/70 |
| 2018/0270245 A1* | 9/2018 | Akkaraju | ............. | H04L 63/102 |

OTHER PUBLICATIONS

Tripathi et al. Novel DCT and DWT based Watermarking Techniques for Digital Images, 2006. IEE. Pages (Year: 2006).*

Barni et al., On the Performance of Multiplicative Spread Spectrum Watermarking, 2002, IEEE, pp. 324-327 (Year: 2002).*

Bouridane, A. (2009). Protection of Fingerprint Data Using Watermarking. In: Imaging for Forensics and Security. Signals and Communication Technology. Springer, Boston, MA. https://doi.org/10.1007/978-0-387-09532-5_6 (Year: 2009).*

* cited by examiner

WATERMARKING IN A VIRTUAL DESKTOP INFRASTRUCTURE ENVIRONMENT

BACKGROUND

To reduce the costs associated with providing employees or members of an organization with high performance computers, some enterprises implement virtual desktop infrastructure (VDI) environments. In a VDI environment, a desktop operating system (OS) such as Microsoft Windows® runs in a data center. A desktop experience is delivered over a network to an endpoint device so that the user can interact with the desktop OS as if it were running locally on the endpoint device. The endpoint can be a computer, laptop, thin client, a mobile device, or any other device that may or may not even have the capability to run the desktop OS on its own. There can be security benefits to utilizing a VDI environment. The data accessed by the user can be housed in the data center rather than on the user's device. Therefore, if a device is stolen or otherwise compromised, the access to the VDI environment can simply be terminated, which protects access to potentially sensitive data.

However, even in a VDI environment, potentially sensitive or confidential information can be accessed by users and shown on the display of the endpoint device. Even if the desktop OS is executed remotely from the endpoint device, a potentially sensitive document, image, or video can be accessed by the user. The user then has the ability to potentially take a screenshot or another image capture, which can compromise the security of the information displayed on the endpoint device. In some cases, an attacker might gain access to a user's credentials can capture potentially sensitive information in this way. As VDI environments become more widely utilized, protecting the information security of content accessed by users via an endpoint device is an increasing need.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to generating watermarks in a virtual desktop infrastructure (VDI) environment identifying information that has been watermarked, particular in a VDI environment. As noted above, an endpoint or client device that a user utilizes to access a VDI desktop can access documents, images, and videos that might not be stored on the endpoint device, but potentially sensitive content can be shown on the display of the endpoint device. Some endpoint device have an ability to allow a user to capture a screenshot or image of visual content being rendered in a display of a client device. Screenshots can include sensitive or proprietary content. One solution for combat or at least identify the source of information leaks is to watermark the information shown on the endpoint device's display. However, many watermarking solutions can be obtrusive and harm the user experience.

Examples of this disclosure can embed a watermark into the imagery displayed by a VDI client device. In implementations according to this disclosure, data can be embedded into the frequency domain of the images displayed on the user's client device. Watermarking according to this disclosure is imperceptible to users to preserve an appropriate end-user experience. Watermarking according to this disclosure can also protect the watermark from image-processing attacks such as lossy compression, noise-filtering, cropping, or other modifications that might occur to an image in which the watermark is embedded. Additionally, extraction of the watermark is possible without needing the original source imagery or the un-watermarked images.

Figure 1:
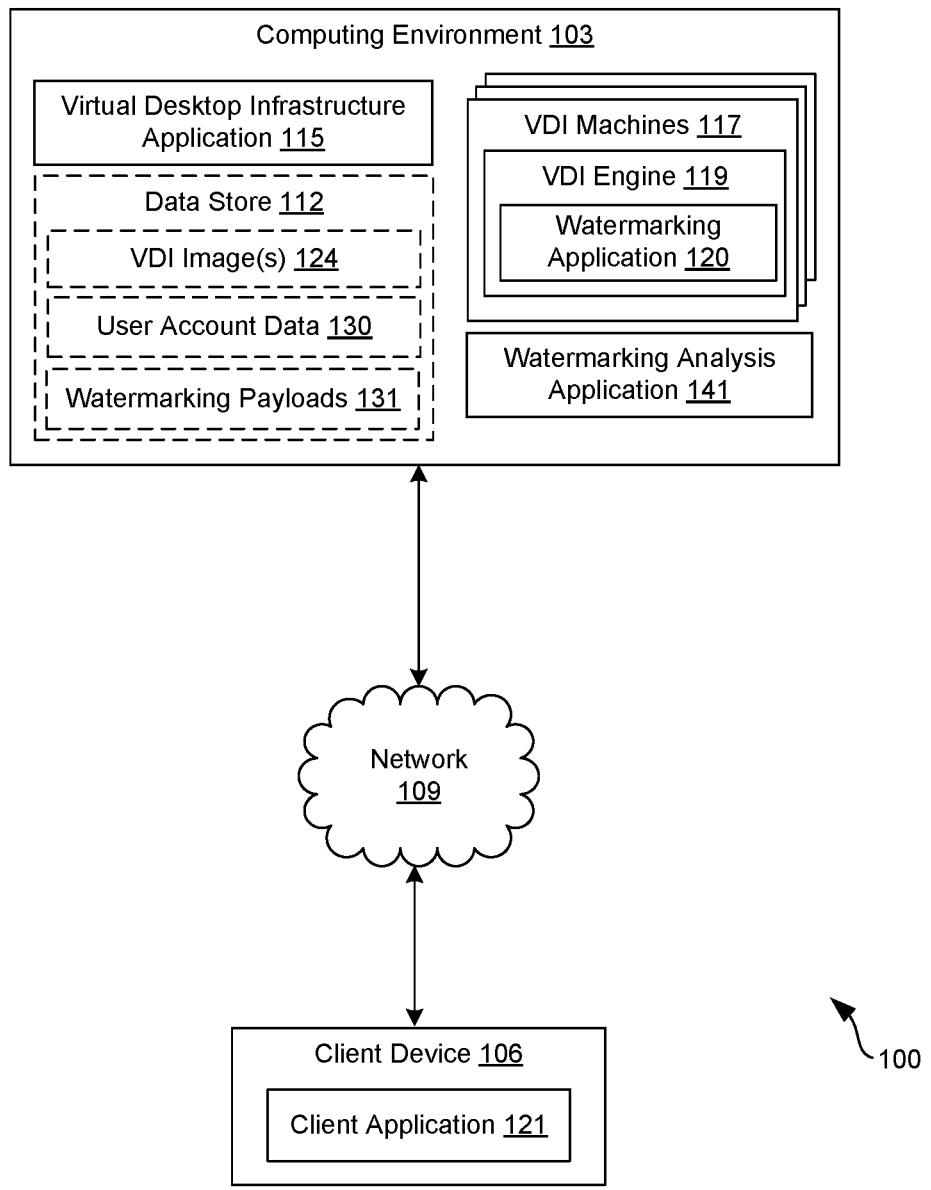
FIG. 1 is a drawing of an example networked environment according to an example of the disclosure.

With reference to FIG. 1, shown is an example of a networked environment 100. The networked environment 100 can include a computing environment 103 and a client device 106 in communication with one another over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, or telephony networks.

The computing environment 103 can include, for example, a server computer or any other system providing computing capability. Alternatively, the computing environment 103 can include a plurality of computing devices that are arranged, for example, in one or more server banks or computer banks. The computing environments 103 can include a grid computing resource or any other distributed computing arrangement. The computing devices can be located in a single installation or can be distributed among many different geographical locations. The computing environments 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above.

The computing environment 103 can power a VDI environment such as VMware Horizon®. The computing environment 103 can include physical or virtual machines that run a desktop operating system on behalf of a user who is assigned to a virtual desktop within the VDI environment. In the context of this disclosure, physical or virtual machines that power a VDI session for a user are referred to as VDI machines 117. There can be various applications and tools that are associated with the VDI environment that are not necessarily pictured or described herein but are not necessary to achieve an understanding of the embodiments of the disclosure. For example, the VDI environment can be executed on virtual machines powered by a proprietary hypervisor within the computing environment 103. Additionally, an application can be executed within the computing environment 103 that enables an administrator to manage or monitor a fleet of physical or virtual machines powering the VDI environment. An application virtualization or application publishing framework can also be provided by and executed within the computing environment 103 to enable applications to be published to users of the enterprise.

A data store 112 can include memory of the computing environment 103 or mass storage resources of the computing environment 103. The data stored in the data store 112, for example, can be associated with the operation of the VDI environment and other applications that are executed within the computing environment 103.

The components executed on the computing environment 103 can include, for example, a VDI application 115 and a watermarking analysis application 141. The VDI application 115 can be executed by one or more of a fleet of virtual or physical machines within the computing environment. Additionally, VDI machines 117 within the computing environment 103 can respectively execute a VDI engine 119. The VDI engine 119 represents one or more applications that power a particular VDI session for a user. The VDI engine 119 can execute an operating system on behalf of a user and transmit images or video representing a desktop computing session to a client device 106 of the user. The VDI engine 119 can also process inputs from a client device 106 and provide the inputs to the operating system running on the VDI machine 117. In response, the VDI machine 117 can provide the inputs to the operating system and update the desktop displayed to the user on the client device 106. The VDI machine 117 can also execute other applications, agents, or services that power a VDI session for a user. For example, a management agent and other VDI utilities and services can be running in a VDI machine 117 to power a VDI experience for users.

The VDI application 115 can coordinate and power a VDI environment for one or more users of an enterprise. The VDI application 115 can service requests from users to start a VDI session, identify a physical or virtual machine within the computing environment 103 on which to run the VDI, and communicate with one or more applications or services running on a client device 106 to facilitate VDI sessions on behalf of users. In some examples, the virtual desktop infrastructure application 115 can provide an administrative console through which an administrator can oversee or manage VDI sessions, machines within the computing environment 103, or other aspects of the VDI environment. The VDI application 115 allows an administrator to configure aspects of a VDI image that is used to service requested VDI sessions for users. For example, an administrator can configure CPU and memory capacities, GPU performance, or other performance aspects of a VDI image 124. Additionally, an administrator can configure an operating system, installed applications, configuration profiles, or other configuration properties associated with a VDI image 124.

The watermarking application 120 can be implemented as an application that is executed on a VDI machine 117. The watermarking application 120 can be a module or library that is implemented within the VDI engine 119. The watermarking application 120 can also be implemented as a standalone application that applies a watermark to images representing the user's desktop that are then transmitted to a client device 106. In one implementation, the watermarking application 120 can apply a watermark to an image or series of images that are sent to the client device 106 by the VDI engine 119 according to a VDI protocol. In this sense, watermarking of the user's VDI session occurs out of protocol in that modification of the VDI protocol is unnecessary. The images can represent frames of video that are rendered by a client application 121 on the client device 106 as the VDI session of the user.

The watermarking analysis application 141 can analyze watermarked images that are generated by the watermarking application 120 by extracting a watermark from a watermarked image and identifying a watermarking fingerprint or watermarking payload 131 that was used to embed the watermark into the image. The watermarking analysis application 141 can also identify a user account associated with the watermark embedded into an image. The watermarking analysis application 141 can be provided as an application within the computing environment 103. The watermarking analysis application 141 can also be provided as a standalone application that is executed on another computing device.

The data stored in the data store 112 can include, for example, VDI images 124, user account data 130, and watermarking payloads 131. The VDI images 124 can include virtual machine images, configuration parameters, operating system images, user files, and other data associated with VDI sessions that can be established on behalf of users. VDI images 124 contain data from which VDI sessions can be created or established by the VDI application 115 or the VDI engine 119 on behalf of a user. VDI images 124 can also include snapshots of particular VDI sessions of users as they connect and disconnect from their respective VDI sessions.

The user account data 130 can include, for example, profile data stored in association with a user account, a user group, or an organization, such as an enterprise. Profile data can include information associated with the user, such as a first name, a middle name, a last name, an email address, a username, a password, a domain, a personal identification number (PIN), or authentication data. In some examples, profile data can identify whether a user's VDI session is required to be watermarked. In some cases, if content associated with particular user's session is determined by the watermarking application 120 or the VDI engine 117 to be sensitive, the watermarking application 120 can generate a watermarked image data that can supplied to the client device 106 as the desktop imagery that is presented as the user's desktop. The particular manner in which the watermarking application 120 can generate a watermark that is applied to imagery shown on the client device 106 is discussed in more detail below.

Watermarking payloads 131 can represent unique data payloads that are used as watermarks and embedded within images that are provided to the client device 106 as the user's desktop in a VDI session. The images can represent a video stream that is displayed to the user as his or her desktop or any other application that is being run by the VDI engine 119 as a part of the user's VDI session. The watermarking payloads 131 can be linked to a particular user identity within an enterprise so that if an image is leaked or data is compromised within the enterprise, an analysis of the leaked data can be performed and it can be determined whether a watermark associated with a user within the enterprise can be extracted from the image, which can aid in determining the source of an information leak or security breach. In some implementations, a watermarking fingerprint from which watermarking payloads 131 are created can be stored in the data store 112 in addition to or instead of watermarking payloads 131.

The client device 106 can be representative of one or more client devices 106 that can execute instances of the client application 121. The client device 106 can include a processor-based system, such as a computer system, that can include a desktop computer, a laptop computer, a personal digital assistant, a cellular telephone, a smartphone, a set-top box, a music player, a tablet computer system, a game console, or an electronic book reader. The client device 106 can include a display 136 that can be a liquid crystal display (LCD) or light emitting diode (LED) display. The client device 106 can also be equipped with network interfaces, including a localized network interface, such as a near-field communication (NFC) interface or radio-frequency identification (RFID) interface.

The client application 121 can operate as a VDI client that can communicate with a VDI machine 117 to obtain data that can be displayed as a virtual desktop of a user. The client device 121 can also obtain user inputs, such as keyboard, mouse, video, or audio input that can be transmitted to a VDI machine 117 and the operating system being executed by a respective VDI engine 119 that is powering a VDI session for the user. In some implementations of the watermarking application 120, the watermarking functionality can be implemented within the client application 121 such that a watermark is applied on the user's desktop in a VDI session. The client device 106 can execute applications beyond the client application 121 such as device management applications, enterprise applications, social networking applications, word processors, spreadsheet applications, or media viewing applications.

Next, a description of how the watermarking application 120 can generate a watermark that can be applied onto a user's desktop is provided. Watermarking according to this disclosure can provide a watermark on the user's desktop by watermarking images that are sent to the client application 121 by the VDI engine 119 as the user's desktop. In other words, the watermark is always present on the user's desktop or on any content displayed by the client application 121 on a display device of the client device 106. The watermark can meet certain objectives that are related to imperceptibility, robustness, blind extraction, security, and performance.

With respect to imperceptibility, the watermark should be relatively unobtrusive in that the addition or overlaying of the watermark onto the user's desktop should not degrade the perceptual quality of the original image. With respect to robustness, the watermark should be robust against common image manipulations, such as cropping of the image, graffiti, collusion attacks, frequency-based attacks (e.g., lossy compression or linear or non-linear filtering), and geometric attacks. With respect to blind extraction, the original image is not necessary in order to extract the watermark because every frame of information provided to the client application 121 as the user's desktop cannot be practically retained. This is especially the case given the streaming nature of frames that comprise the user's desktop in a VDI context.

With respect to security, watermarking according to this disclosure can be considered secure even if the exact process for embedding and extracting the watermark are known to an attacker because the attacker will not necessarily possess the watermarking fingerprint used to generate the watermark. With respect to performance, the watermarking process should not require extensive resources to apply or impede the performance of a VDI machine 117 or client application 121 applying the watermark.

Next, a discussion of the operation of the various components of the networked environment 100 is provided. In particular, a discussion of how the watermarking application 120 can generate a watermark that is applied to a user's VDI session is provided.

Figure 2:
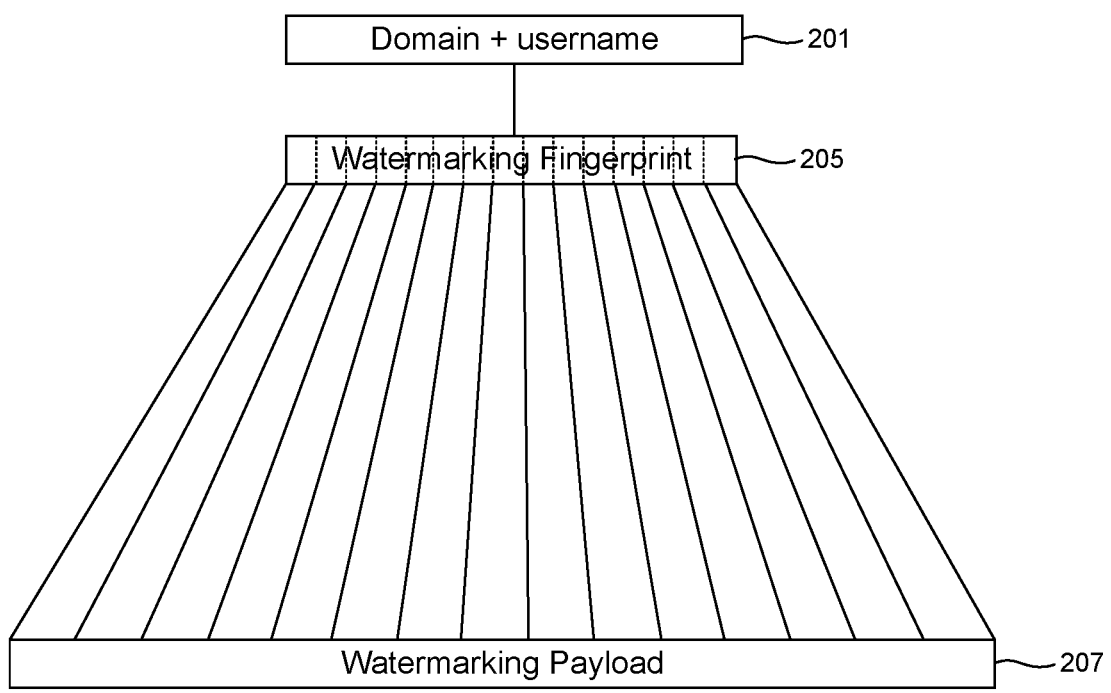
FIG. 2 is a drawing illustrating how a watermarking payload can be generated according to examples of the disclosure.

FIG. 2 illustrates how the watermarking application 120 can generate a watermarking payload 207 that can be embedded into imagery sent to the client application 121 and displayed by the client device 106. The payload of the watermark can include information that can be used to identify the user of a VDI session if a screenshot or image of the user's desktop is leaked or obtained by an attacker. The watermarking payload 207 can be of a fixed length and unique to the user. Additionally, the identity of the user is not embedded into the watermarking payload 207 for user security and privacy.

In the example shown in FIG. 2, the domain and username of the user can be combined to generate a domain/username pair 201. The domain/username pair 201 can be generated by concatenating the domain to the username or vice versa. The domain/username pair 201 can be substituted with a user identifier or any other identifier that can uniquely identify a user or a device within an enterprise that are associated with a particular VDI session. The domain and username can be obtained by the watermarking application 120 from the user data 130 associated with the user.

The domain/username pair 201 can be hashed to generate a watermarking fingerprint 205. In one example, the watermarking fingerprint 205 can be generated using a Password-Based Key Derivation Function 2 (PBKDF2) with the domain/username pair 201 as an input password or passphrase to the derivation function. The watermarking fingerprint 205 can represent a cryptographic key that is unique to the user but a key from which the user's identity is cannot be ascertained by an attacker. Additionally, the key derivation function can employ a collision-resistant has function, such as SHA256. The key derivation function can also utilize a salt and a predetermined number of rounds to defend against dictionary attacks and/or rainbow tables. The watermarking application 120 can then generate a watermarking payload 207 from the watermarking fingerprint 205.

To generate the watermarking payload 207, the watermarking fingerprint 205 is utilized as a seed to a pseudo-random number generator. In one implementation, the polar method, or Marsaglia polar method, can be utilized to generate an array of random numbers from the watermarking fingerprint 205. The array represents the watermarking payload 207. In one implementation, the watermarking fingerprint 205 is segmented into a plurality of 4-byte chunks that are feed into a pseudorandom number generator as seeds to generate the watermarking payload 207. The watermarking payload 207 in effect is the watermark that can be embedded into an image or a video frame. The distribution of the random values will be unique to each watermarking fingerprint 205.

Figure 3:
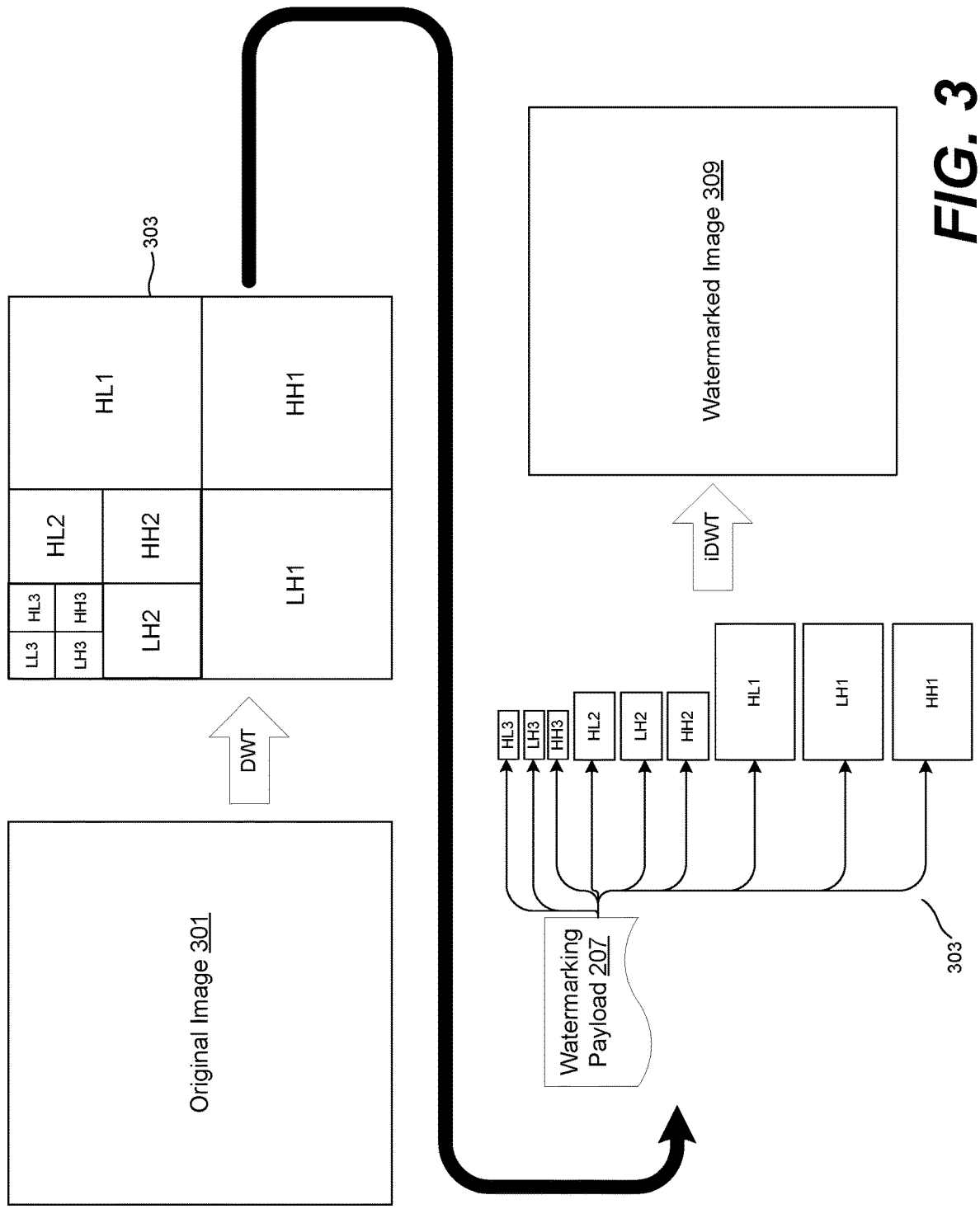
FIG. 3 is a drawing illustrating a workflow of the watermarking process according to examples of the disclosure.

Referring next to FIG. 3, shown is an example of how the watermarking payload 207 can be embedded into an image by the watermarking application 120. First, the original image 301 is obtained by the watermarking application 120. The original image 301 represents a frame of video that is an un-watermarked version of the user's desktop. The original image 301 can be obtained from the VDI engine 119 or a display driver or service that generates images or video frames that are transmitted to the client application 121. In some implementations, the watermarking application 120 isolate the Y-channel in the YUV color encoding system and apply the watermark only to the Y-channel. The Y-channel represents the luminance or grayscale component of the original image 301. In an enterprise setting, most text and documents are rendered as grayscale, so the Y-channel will often include the most important data for watermarking purposes as well.

Accordingly, the watermarking application 120 can perform a discrete wavelet transformation (DWT) on the original image 301 to produce a series of wavelet functions. The resultant wavelet functions characterize the original image 301 in the frequency and time domains. In the implementation shown in FIG. 3, the watermarking application 120 can perform three levels of DWT decomposition to produce three sets wavelet functions that characterize the original image 301. In some implementations, the original image 301 can be segmented into 256×256 blocks and the DWT can be performed on each block.

The watermark is applied to wavelet functions that characterize the original image 301 rather than in the spatial domain. As a general matter, images occupy the spatial domain by way of RGBA pixels. Watermarks that are embedded in the spatial domain are more susceptible to spatial attacks such as cropping of the original image 301. By applying the watermark into the frequency domain, spatial attacks are less effective to defeat the watermark. Even in the frequency domain a watermark can be susceptible to attacks (or even non-malicious degradation), if the watermark is embedded into the insignificant regions of the frequency domain. For example, high frequency regions are often lost during lossy compression of an image. To combat this, embodiments of the disclosure use spread spectrum by embedding the same data across multiple frequency coefficients.

By performing one or more levels of DWT for embedding the watermark, the application of the watermark is more resistant to image manipulation attacks because DWT retains frequency and spatial information that characterizes the original image 301. The DWT is performed by computing both the high and low frequency domains of the image at various levels as shown in FIG. 3. In the example of FIG. 3 three levels of DWT are performed and wavelet functions for the various levels are obtained. The watermark payload can be utilized to embed the watermark across high frequency sub-bands to maximize coverage in the spectrum and provide robustness in the frequency domain. Returning to FIG. 3, the DWT is performed on the original image 301 to obtain wavelet functions 303 that characterize the original image 301.

Next, the watermarking application 120 can embed the watermarking payload 207 into the image by embedding the payload into the wavelet functions 303 that characterize the original image 301. In the case of an original image 301 from which the watermarking application 120 has isolated the Y-channel, the watermarking payload 207 can be embedded into the wavelet functions 303 that characterize the Y-channel using a multiplicative embedding rule. Instead of using an additive process in which watermark coefficients are added to the DWT coefficients, the watermarking application 120 can use multiplicative embedding, which achieves a greater degree of imperceptibility than additive embedding of the watermark. The multiplicative embedding rule is described by:

$$y = x_i(1 + \gamma^* \omega_{[i\%SIGLEN]}) \ i = 1, \ldots, N$$

where $\gamma$ is a gain factor, $\omega$ is a sequence of watermark signals from the watermarking payload 207, $x_i$ represents an amplitude associated with a data point of the DWT conversion, and y represents a sequence of watermarked data. A frequency domain transform such as DWT can convert a one-dimensional array representing an image (e.g., time [amplitude]) into set of frequencies, where each frequency (i) is associated with an amplitude (x). In some implementations, the $x_i$ values can also be represented by $x_{i,j}$, where i and j are vertical and horizontal frequencies. In other words, a two-dimensional array can also be generated by the DWT.

By multiplying the watermark coefficients with the image coefficients, only the edge coefficients change a great deal while changes to the other coefficients are comparatively less. Therefore, multiplicative watermarks achieve better visual imperceptibility in general. After embedding the watermark payload 207 into the wavelet functions, an inverse DWT is performed on the watermarked wavelet functions to obtain a watermarked image 309. In other words, the watermarked image 309 is generated by reconstructing the original image 301 using the wavelet functions in which the watermark payload 207 is embedded. Is this way, the watermarked Y-channel is combined with the un-watermarked U-channel and un-watermarked V-channel to generate the watermarked image 309. The watermarked image 309 can be provided to the client application 121 and represents a frame of video corresponding to the user's desktop or other content shown on the display of the client device 106.

Figure 4:
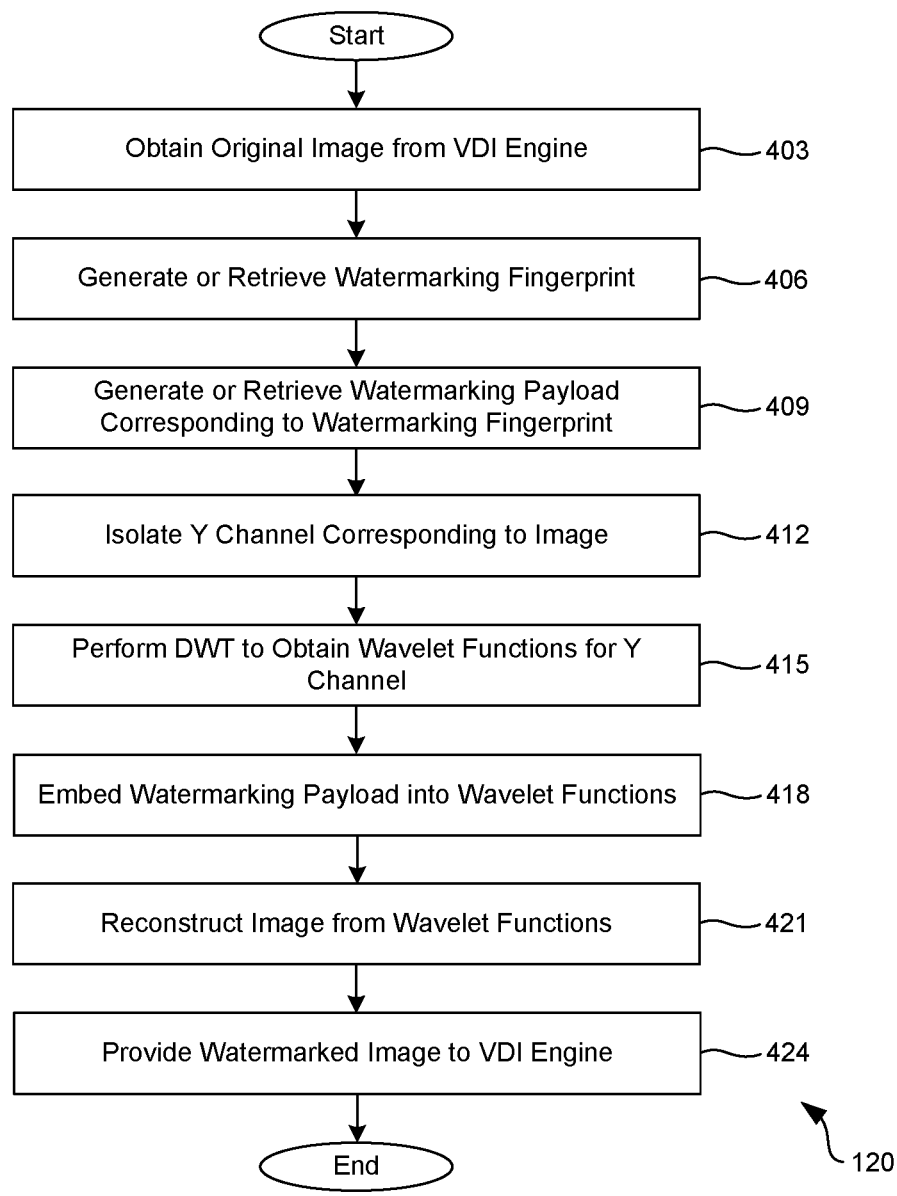
FIG. 4 is a flowchart illustrating an example of functionality implemented by components that can be executed in the networked environment of FIG. 1.

Referring next to FIG. 4, shown is a flowchart that provides one example of the operation of the watermarking application 120. As an alternative, the flowchart of FIG. 4 can be viewed as depicting an example of steps of a method implemented by an application or service that generates a watermarked image to a client application 121. In some cases, the watermarking process can be performed within the client application 121 or in an application on the client device 106. The separation or segmentation of functionality as discussed herein is presented for illustrative purposes only.

At step 403, the watermarking application 120 can obtain an original image 301 from the VDI engine 119. The original image 301 represents a frame of video that is an un-watermarked version of the user's desktop. The original image 301 can be obtained from the VDI engine 119 or a display driver or service that generates images or video frames that are transmitted to the client application 121.

At step 406, example, the watermarking fingerprint 205 that corresponds to the user's VDI session can be generated or retrieved. In some implementations, a watermarking fingerprint 205 corresponding to the user can be generated once or periodically, and then stored in the data store 112 for use in subsequent VDI sessions. In other implementations, the watermarking fingerprint 205 can be generated each time a user initiates a VDI session. As described above, the watermarking fingerprint 205 can be unique to the user and generated using a key derivation function from some identifying information about the user or the user's client device 106. In one example, the watermarking fingerprint 205 can be generated using a PBKDF2 with the username and/or password used as an input password or passphrase to the derivation function. The key derivation function can also utilize a salt and a number of rounds to defend against dictionary attacks and/or rainbow tables. The watermarking application 120 can then generate a watermarking payload 207 from the watermarking fingerprint 205.

Next, at step 409, the watermarking application 120 can generate or retrieve the watermarking payload 207. In some implementations, a watermarking payload 207 corresponding to the user can be generated once or periodically, and then stored in the data store 112 for use in subsequent VDI sessions. In other implementations, the watermarking payload 207 can be generated each time a user initiates a VDI session. To generate the watermarking payload 207, the watermarking fingerprint 205 is utilized as a seed to a pseudorandom number generator. In one implementation, the polar method can be utilized to generate an array of random numbers from the watermarking fingerprint 205. The array represents the watermarking payload 207. The watermarking payload 207 is the watermark that can be embedded into an image or a video frame. The distribution of the random values will be unique to each watermarking fingerprint 205.

At step 412, the watermarking application 120 can isolate the Y-channel corresponding to the original image 301. In one example, the watermarking application 120 can apply the watermark only to the Y-channel in the YUV color encoding system. Again, the Y-channel represents the luminance or grayscale component of the original image 301. In an enterprise setting, most text and documents are rendered as grayscale, so the Y-channel will often include the most important data for watermarking purposes.

At step 415, the watermarking application 120 can perform DWT on the isolated Y-channel from the original image 301 to produce a series of wavelet functions. The resultant wavelet functions characterize the Y-channel of original image 301 in the frequency and time domains. The watermarking application 120 can perform three levels of DWT decomposition to produce three sets wavelet functions that characterize the Y-channel original image 301.

At step 418, the watermarking application 120 can embed the watermarking payload 207 into the image by embedding the payload into the wavelet functions 303 that characterize the Y-channel of the original image 301. The watermarking payload 207 can be embedded into the wavelet functions 303 that characterize the Y-channel using a multiplicative embedding rule. Again, instead of using an additive process in which watermark coefficients are added to the DWT coefficients, the watermarking application 120 can use multiplicative embedding, which achieves a greater degree of imperceptibility than additive embedding of the watermark.

At step 421, after embedding the watermark payload 207 into the wavelet functions, an inverse DWT is performed to obtain a watermarked image 309. In other words, the watermarked image 309 is generated by reconstructing the original image 301 using the wavelet functions in which the watermark payload 207 is embedded.

At step 424, the watermarked image 309 can be provided to VDI engine 119. The VDI engine 119 can transmit the watermarked image 309 to the client application 121. The watermarked image 309 represents a frame of video corresponding to the user's desktop or other content shown on the display of the client device 106. Thereafter, the process proceeds to completion. The process shown in FIG. 4 can be repeated for each frame that is streamed to the client application 121 to form the user's desktop or whatever content is shown on the display of the client device 106. In this way, if information is leaked or otherwise compromised, an analysis of the image can be performed to determine whether the watermark that is embedded into the original image 301 can be extracted.

Figure 5:
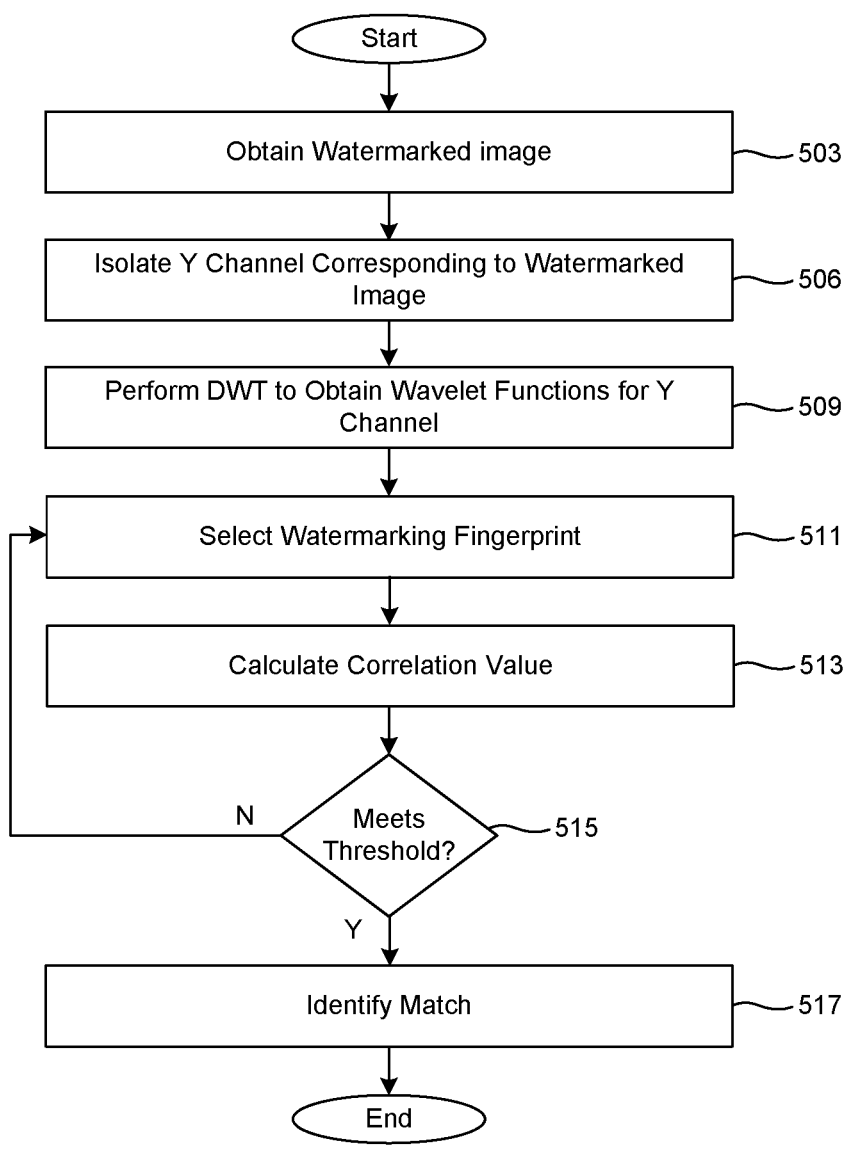
FIG. 5 is a flowchart illustrating an example of functionality implemented by components that can be executed in the networked environment of FIG. 1.

Referring next to FIG. 5, shown is a flowchart that provides one example of the operation of the watermarking analysis application 141. As an alternative, the flowchart of FIG. 5 can be viewed as depicting an example of steps of a method implemented by an application or service that extracts a watermark from a watermarked image. In some cases, the watermark extraction process can be performed within the watermarking analysis application 141 or in another application executed on a computing device. The separation or segmentation of functionality as discussed herein is presented for illustrative purposes only.

Watermark extraction can be performed in a scenario in which a screenshot or video has been leaked and that might contain proprietary data or information. Additionally, if an enterprise desires to identify the source of an information leak by identifying a user account or device associated with the leak, watermark extraction and matching to a particular watermark can be performed. Additionally, watermarking according to this disclosure provides for blind extraction without the original image 301.

Accordingly, at step 503, the watermarking analysis application 141 can obtain a watermarked image. The image can be provided by a user, such as an administrator or security personnel, who is tasked with identifying the source of an information leak. At step 506, the watermarking application 120 can isolate the Y-channel corresponding to the watermarked image 309. In one example, the watermarking application 120 can apply the watermark only to the Y-channel in the YUV color encoding system. Again, the Y-channel represents the luminance or grayscale component of the original image 301. In an enterprise setting, most text and documents are rendered as grayscale, so the Y-channel will often include the most important data for watermarking purposes. If such a watermarking scheme has been applied, then the same channel should be isolated during watermark extraction.

Once the DWT components of the watermarked image 309 are generated, the process proceeds to step 511. At step 511 a watermarking fingerprint 205 can be selected from the data store 112. The watermarking analysis application 141 can iterate through the various watermarking fingerprints 205 previously generated for users to determine which watermarking fingerprint is correlated to the watermark extracted from the watermarked image 309. While iterating through watermarking fingerprints 205 is potentially more time-consuming than the process of applying a watermark, speed during watermark extraction is not as important as during watermark insertion.

At step 513, the watermarking analysis application 141 calculates a correlation value that characterizes a correlation between the watermark embedded in the DWT components and the watermarking fingerprint 205 that is selected. The correlation value is calculated as follows. At matching value δ is computed that relates the selected watermarking fingerprint 205 to the watermark embedded into the DWT components extracted from the watermarked image 309 according to the following equation:

$$\delta(z) = \frac{1}{N}\sum_{i=1}^{N} \omega_i z_i^2$$

In the above equation, z is a sequence of output from the watermarking channel and ω represents the selected watermarking fingerprint 205. A detection threshold that is based upon the variance of the total watermarking channel is specified below:

$$\eta = \bar{\gamma}\sigma^2\sigma_\omega^2$$

In the above equation, $\sigma^2$ represents the total variance of the watermarking channel. For each DWT coefficient extracted from the watermarked image 309, if δ is greater than η, a positive correlation between the selected watermarking fingerprint 205 and the watermarked image 309 exists. A total correlation between the selected watermarking fingerprint 205 and the watermarked image 309 can be calculated using the above detection framework.

At step 515, the watermarking analysis application 141 determines if the total correlation between the selected watermarking fingerprint 205 and the watermark extracted from the watermarked image 309 meets a correlation threshold. In one example, the watermarking analysis application 141 can generate a confidence score associated with the correlation between the watermark extracted from the watermarked image 309 and the selected watermarking fingerprint 205. If confidence score does not meet the threshold, the process can return to step 511, where the watermarking analysis application 141 selects a new watermarking fingerprint 205 to analyze against the watermarked image 309. If the score meets the threshold, the watermarking analysis application 141 can proceed to step 721.

At step 517, the watermarking analysis application 141 can identify a match between the selected watermarking fingerprint 205 and the watermark extracted from the watermarked image 209. In one example, upon identifying a match, the watermarking analysis application 141 can identify a user associated with the watermarking fingerprint 205 and provide the identity of the user to an administrator or security personnel as the user account linked to an information leak or other security compromise. Thereafter, the process proceeds to completion.

The flowcharts of FIGS. 4-5 show examples of the functionality and operation of implementations of components described herein. The components of the networked environment 100 described herein can be embodied in hardware, software, or a combination of hardware and software. If embodied in software, each step in the flowcharts of FIGS. 4-5 can represent a module or a portion of code that includes computer instructions to implement the specified logical functions. The computer instructions can be embodied in the form of source code that includes human-readable statements written in a programming language or machine code that includes machine instructions recognizable by a suitable execution system, such as a processor in a computer system or other system. If embodied in hardware, each step can represent a circuit or a number of interconnected circuits that implement the specified logical functions.

Although the flowcharts of FIGS. 4-5 show a specific order of execution, it is understood that the order of execution can differ from that which is shown. For example, the order of execution of two or more steps can be switched relative to the order shown. Also, two or more steps shown in succession can be executed concurrently or with partial concurrence. Further, in some examples, one or more of the steps shown in the flowcharts can be skipped or omitted. In addition, any number of counters, state variables, warning semaphores, or messages can be added to the logical flow described herein, for purposes of enhanced utility, accounting, performance measurement, or troubleshooting aid. All such variations are within the scope of the present disclosure.

The computing environment 103, client device 106, and other components described herein can each include at least one processing circuit. Such a processing circuit can include one or more processors and one or more storage devices that are coupled to a local interface. The local interface can include a data bus with an accompanying address/control bus.

A storage device for a processing circuit can store data and components that are executable by the one or more processors of the processing circuit. In some examples, the VDI application 115, the watermarking application 120, and the client application 121 can be stored in one or more storage devices and be executable by one or more processors. Also, the data store 112 can be located in the one or more storage devices.

The VDI application 115, the watermarking application 120, the client application 121, and other components described herein can be embodied in the form of hardware, as software components that are executable by hardware, or as a combination of software and hardware. If embodied as hardware, the components described herein can be implemented as a circuit or state machine that employs any suitable hardware technology. Such hardware technology includes, for example, one or more microprocessors, discrete logic circuits having logic gates for implementing various logic functions upon an application of one or more data signals, application specific integrated circuits (ASICs) having appropriate logic gates, or programmable logic devices, such as field-programmable gate array (FPGAs) and complex programmable logic devices (CPLDs).

Also, one or more or more of the components described herein that include software or computer instructions can be embodied in any non-transitory computer-readable medium for use by or in connection with an instruction execution system such as, for example, a processor in a computer system or other system. Such a computer-readable medium can contain, store, and maintain the software or computer instructions for use by or in connection with the instruction execution system.

A computer-readable medium can include a physical media, such as, magnetic, optical, semiconductor, or other suitable media. Examples of a suitable computer-readable media include solid-state drives, magnetic drives, flash memory, and storage discs, such as compact discs (CDs). Further, any logic or component described herein can be implemented and structured in a variety of ways. For example, one or more components described can be implemented as modules or components of a single application. Further, one or more components described herein can be executed in one computing device or by using multiple computing devices.

The examples described above are merely examples of implementations to set forth for a clear understanding of the principles of the disclosure. Many variations and modifications can be made to the examples described above without departing substantially from the spirit and principles of the disclosure. All such modifications and variations are intended to be included herein within the scope of this disclosure.

Therefore, the following is claimed:

1. A non-transitory computer-readable medium embodying a program for generating a watermarked image that is executable in at least one computing device, wherein when executed, the program causes the at least one computing device to at least:
    obtain an image corresponding to a virtual desktop infrastructure (VDI) desktop associated with a user;
    generate a watermarking fingerprint based upon an identity of the user;
    generate a watermarking payload based upon the watermarking fingerprint;
    perform at least one discrete wavelet transform (DWT) on the image to produce a plurality of wavelet functions, the DWT performed on a Y channel extracted from the image in a YUV color encoding system to create a watermarked Y channel, wherein the plurality of watermarked wavelet functions correspond to the watermarked Y channel;

embed the watermarking payload into the plurality of wavelet functions to produce a plurality of watermarked wavelet functions using a multiplicative embedding rule that characterizes the Y channel with a gain factor, a sequence of watermark signals from the watermarking payload, and an amplitude associated with a data point of the DWT, the plurality of watermarked wavelet functions comprising the watermarked Y channel, an un-watermarked U channel, and an un-watermarked V channel;

generate the watermarked image from the plurality of watermarked wavelet functions using an inverse discrete wavelet transform; and transmit the watermarked image to a client device executing a VDI client associated with the user.

2. The non-transitory computer-readable medium of claim 1, wherein the watermarking fingerprint is generated by computing an output of a key derivation function, wherein a username and a domain associated with the user are used as inputs to the key derivation function.

3. The non-transitory computer-readable medium of claim 2, wherein the key derivation function comprises Password-Based Key Derivation Function 2 (PBKDF2).

4. The non-transitory computer-readable medium of claim 1, wherein the watermarking payload comprises an array of coefficients, the array of coefficients generated by inputting the watermarking fingerprint into a random number generator configured to output at least one of: an array of random numbers or an array of pseudorandom numbers.

5. The non-transitory computer-readable medium of claim 4, wherein the watermarking payload is embedded into the plurality of wavelet functions by multiplying the array of coefficients with respective coefficients corresponding to the plurality of wavelet functions.

6. A method for generating a watermarked image, comprising:

obtaining an image corresponding to a virtual desktop infrastructure (VDI) desktop associated with a user;

generating a watermarking fingerprint based upon an identity of the user;

generating a watermarking payload based upon the watermarking fingerprint;

performing at least one discrete wavelet transform (DWT) on the image to produce a plurality of wavelet functions, the DWT performed on a Y channel extracted from the image in a YUV color encoding system to create a watermarked Y channel, wherein the plurality of watermarked wavelet functions correspond to the watermarked Y channel;

embedding the watermarking payload into the plurality of wavelet functions using a multiplicative embedding rule that characterizes the Y channel with a gain factor, a sequence of watermark signals from the watermarking payload, and an amplitude associated with a data point of the DWT to produce a plurality of watermarked wavelet functions, the plurality of watermarked wavelet functions comprising the watermarked Y channel, an un-watermarked U channel, and an un-watermarked V channel;

generating the watermarked image from the plurality of watermarked wavelet functions using an inverse discrete wavelet transform; and transmitting the watermarked image to a client device executing a VDI client associated with the user.

7. The method of claim 6, wherein the watermarking fingerprint is generated by computing an output of a key derivation function, wherein a username and a domain associated with the user are used as inputs to the key derivation function.

8. The method of claim 7, wherein the key derivation function comprises Password-Based Key Derivation Function 2 (PBKDF2).

9. The method of claim 6, wherein the watermarking payload comprises an array of coefficients, the array of coefficients generated by inputting the watermarking fingerprint into a random number generator configured to output at least one of: an array of random numbers or an array of pseudorandom numbers.

10. The method of claim 9, wherein the watermarking payload is embedded into the plurality of wavelet functions by multiplying the array of coefficients with respective coefficients corresponding to the plurality of wavelet functions.

11. A system for generating a watermarked image, comprising:

at least one computing device in data communication with a client device over a network;

program code that, when executed by the at least one computing device, causes the at least one computing device to:

obtain an image corresponding to a virtual desktop infrastructure (VDI) desktop associated with a user;

generate a watermarking fingerprint based upon an identity of the user;

generate a watermarking payload based upon the watermarking fingerprint;

perform at least one discrete wavelet transform (DWT) on the image to produce a plurality of wavelet functions, the DWT performed on a Y channel extracted from the image in a YUV color encoding system to create a watermarked Y channel, wherein the plurality of watermarked wavelet functions correspond to the watermarked Y channel;

embed the watermarking payload into the plurality of wavelet functions using a multiplicative embedding rule that characterizes the Y channel with a gain factor, a sequence of watermark signals from the watermarking payload, and an amplitude associated with a data point of the DWT to produce a plurality of watermarked wavelet functions, the plurality of watermarked wavelet functions comprising the watermarked Y channel, an un-watermarked U channel, and an un-watermarked V channel;

generate the watermarked image from the plurality of watermarked wavelet functions using an inverse discrete wavelet transform; and transmit the watermarked image to the client device executing a VDI client associated with the user.

12. The system of claim 11, wherein the watermarking fingerprint is generated by computing an output of a key derivation function, wherein a username and a domain associated with the user are used as inputs to the key derivation function.

13. The system of claim 12, wherein the key derivation function comprises Password-Based Key Derivation Function 2 (PBKDF2).

14. The system of claim 11, wherein the watermarking payload comprises an array of coefficients, the array of coefficients generated by inputting the watermarking fingerprint into a random number generator configured to output at least one of: an array of random numbers or an array of pseudorandom numbers.

15. The system of claim 14, wherein the watermarking payload is embedded into the plurality of wavelet functions by multiplying the array of coefficients with respective coefficients corresponding to the plurality of wavelet functions.

* * * * *